United States Patent [19]

Hammett

[11] 4,262,746

[45] Apr. 21, 1981

[54] VISCOELASTIC POLYMER BANK WITH IMPROVED MOBILITY CONTROL

[75] Inventor: Robert E. Hammett, Tulsa, Okla.

[73] Assignee: Standard Oil Company (Indiana), Chicago, Ill.

[21] Appl. No.: 973,359

[22] Filed: Dec. 26, 1978

[51] Int. Cl.³ .............................................. E21B 43/22
[52] U.S. Cl. .................................... 166/273; 166/275; 252/8.55 D
[58] Field of Search ............... 166/275, 274, 273, 246, 166/308, 294, 281; 252/8.55 D

[56] References Cited

U.S. PATENT DOCUMENTS

| | | | |
|---|---|---|---|
| 3,039,529 | 6/1962 | McKennon | 166/275 |
| 3,215,634 | 11/1965 | Walker | 166/275 |
| 3,785,437 | 1/1974 | Clampitt et al. | 166/281 |
| 3,822,746 | 7/1974 | Gogarty | 166/275 X |
| 3,825,067 | 7/1974 | Vestal | 166/275 |
| 3,908,760 | 9/1975 | Clampitt et al. | 166/246 |
| 4,049,054 | 9/1977 | Wier | 166/275 X |
| 4,078,607 | 3/1978 | Carter et al. | 166/246 |
| 4,104,193 | 8/1978 | Carter et al. | 166/246 X |

OTHER PUBLICATIONS

*Manufacturing Chemist*, "New Polysaccharide Gums Produced by Microbial Synthesis", vol. XXXI, No. 5, May 1960, pp. 206–208.

Jeanes et al., "Polysaccharide B-1459: A New Hydro Colloid Polyelectrolyte Produced from Glucose by Bacterial Fermentation", *Journal of Applied Polymer Science*, vol. 5, No. 17, pp. 519–526, (1961).

*Primary Examiner*—Stephen J. Novosad
*Attorney, Agent, or Firm*—Fred E. Hook; Donald L. Traut

[57] ABSTRACT

A viscoelastic polymer such as polyacrylamide is first prehydrated in an aqueous fluid having a low degree of hardness and the prehydrated viscoelastic polymer solution is mixed with hard brine to provide a polymer bank with improved mobility control. This improved mobility control is obtained by mixing the hard brine with the prehydrated viscoelastic polymer at high volume ratios of hard brine to the polymer.

4 Claims, No Drawings

VISCOELASTIC POLYMER BANK WITH IMPROVED MOBILITY CONTROL

BACKGROUND OF THE INVENTION

Polyacrylamide is used in aqueous fluids for displacing oil through crude oil containing reservoirs. Sufficient polyacrylamide is included in the aqueous fluid to reduce the mobility of the fluid in the reservoir and thereby improve the sweep or displacement of fluids through the reservoir. The polymer-containing aqueous fluid can be referred to as a polymer bank or mobility buffer bank. The polymer bank is used for directly displacing crude oil through a reservoir or displacing surfactant fluid such as a micellar fluid through a reservoir.

Water that is commercially available for the formulation of the polymer bank can be a hard brine with a high salinity. Such brines can contain greater than about 500 milligrams/liter (mg/l) of divalent ions and have greater than about 5,000 mg/l of total dissolved solids. Some brines from which polymer banks are formulated can have greater than about 1,000 mg/l of divalent ions and greater than about 10,000 mg/l of total dissolved solids.

Salinity of a brine, as indicated by the total dissolved solids, and the hardness of the brine, as indicated by the divalent ion concentration, are significant factors in the efficiency with which a polymer bank formulated with the brine can displace fluids through a reservoir. An increase in the salinity and hardness tends to decrease the resistance to movement of the polymer bank through a reservoir. It has been observed that divalent ions which contribute to hardness and salinity have a greater effect on decreasing resistance to movement than do monovalent ions which only contribute to salinity. Therefore, changes in divalent ion concentrations have greater effects on resistance to movement than equivalent changes in monovalent ion concentrations.

The resistance to movement of a polymer bank in a reservoir can be described in terms of a resistance factor which reflects the decrease in the mobility of a polymer bank through a reservoir in comparison with the mobility of the aqueous fluid with which the polymer bank is formulated. The permeability of the reservoir to the aqueous fluid used in formulating the polymer bank and to the fluids constituting the polymer bank, as well as the viscosities of the aqueous fluid used in formulating the polymer bank and the fluid constituting the polymer bank, are included in the resistance factor calculations. Measurements made with a screen viscometer have been found to correlate closely to such resistance factor calculations. This screen viscometer has a fluid volume of about 30 ml and consists of a pack of five 0.25-inch (0.635-centimeter) diameter stainless steel screens. The screens are 100 mesh USTM standard screen size. The flow time of fresh water through the viscometer is about 8 to 10 seconds. Prior to passing the fluid through the viscometer, it is filtered through a 200 mesh screen.

SUMMARY OF THE INVENTION

The resistance of an aqueous viscoelastic polymer solution to movement through a subterranean reservoir is increased by prehydrating a viscoelastic polymer such as polyacrylamide in an aqueous fluid having a low hardness of not greater than about 100 mg/l of divalent cations and total dissolved solids of not greater than about 10,000 mg/l and preferably less than about 5,000 mg/l and mixing the prehydrated viscoelastic polymer with a hard, saline brine to form the viscoelastic polymer solution. A viscoelastic polymer solution prepared by mixing high volume ratios of hard, saline brine with prehydrated viscoelastic polymer, such as 80 parts by volume hard, saline brine with 20 parts by volume prehydrated viscoelastic polymer, has a greater resistance to movement through a subterranean reservoir than a viscoelastic polymer solution of substantially the same hardness and salinity where the viscoelastic polymer is hydrated directly in the hard, saline brine.

DESCRIPTION OF THE PREFERRED EMBODIMENTS

It has been found that the resistance to movement through a subterranean reservoir of a hard, saline aqueous viscoelastic polymer solution can be increased by first prehydrating the viscoelastic polymer in an aqueous fluid having a low degree of hardness and salinity and preferably having no hardness and a low degree of salinity and thereafter mixing the prehydrated viscoelastic polymer with the hard, saline aqueous fluid. The improvement is observed when the viscoelastic polymer is prehydrated in a low salinity aqueous fluid having a low hardness of less than about 100 mg/l of divalent cations and total dissolved solids of less than about 10,000 mg/l and preferably less than about 5000 mg/l and when the prehydrated viscoelastic polymer solution is mixed at a ratio of less than about 40 parts by volume prehydrated viscoelastic polymer solution with greater than about 60 parts by volume of a saline aqueous fluid having a high hardness of greater than about 500 mg/l divalent cations and total dissolved solids of greater than about 5000 mg/l. Further improvement is observed when the prehydrated viscoelastic polymer solution is mixed at a ratio of less than about 20 parts by volume prehydrated viscoelastic polymer solution with greater than about 80 parts by volume of the hard, saline aqueous fluid. The improvement, as illustrated with respect to the following tables, decreases when a viscoelastic polymer such as polyacrylamide is prehydrated in aqueous fluid containing divalent cations and when there is only a small difference between the divalent cation concentration and the total dissolved solids of the hard, saline aqueous fluid as compared to the fluid in which the viscoelastic polymer is hydrated. The magnitude of the improvement is greatest when the viscoelastic polymer is prehydrated in a low salinity, low hardness brine and is mixed with a high hardness, high salinity brine such as an aqueous fluid having a salinity of greater than about 10,000 mg/l of total dissolved solids and a hardness of greater than about 1000 mg/l of divalent cations. Examples of high molecular weight water soluble polymers which exhibit viscoelastic characteristics are polyacrylamide, copolymers of acrylamide with acrylate, polyethyleneoxide and carboxymethylcellulose.

This improvement in resistance to movement can be obtained by mixing the prehydrated viscoelastic polymer with the hard brine prior to injecting the mixture into a reservoir as a hard, saline polymer bank. Additionally, the prehydrated viscoelastic polymer can mix with hard brine in a reservoir to form the hard, saline polymer bank in situ.

TABLE I

Polyacrylamide* Hydrated in the Indicated Aqueous Fluid at a Concentration of about 1,000 mg/l of Aqueous Fluid

| | | |
|---|---|---|
| Distilled water | 27.5 | 40.5 |
| Distilled water 8,000 mg/l NaCl | 20.2 | 4.4 |
| Hendrick Reef Water 1,115 mg/l Divalent Ions 8,730 mg/l Total Dissolved Solids (TDS) | 10.6 | 2.2 |
| South Station Water 1,730 mg/l Divalent Ions 24,400 mg/l TDS | 11.7 | 2.2 |

*Polyacrylamide marketed by the Betz Chemical Company under the tradename "Uniperm".

The influence of the hardness and salinity of the water in which polyacrylamide is hydrated is illustrated in Table 1. It is shown that the viscosity of the fluid in which the polyacrylamide is hydrated and its resistance to movement through a reservoir, as indicated by screen factor measurements, are reduced by salinity and further reduced by hardness. The screen factor of polyacrylamide hydrated in a brine having total dissolved solids of 8,000 mg/l and no hardness is about 75% of the screen factor of polyacrylamide hydrated in distilled water. Polyacrylamide hydrated in brine having greater than about 1,000 mg/l of divalent cations and greater than about 8,000 mg/l of total dissolved solids has a screen factor of about 40% of the screen factor and about 5% of the viscosity of polyacrylamide hydrated in distilled water. As is also seen, additional salinity or hardness above minimum detrimental concentrations does not further reduce the resistance of the polyacrylamide solution to movement through a reservoir or the viscosity of the solution.

TABLE II

Polyacrylamide[1] Hydrated in Brine and Mixed with Hendrick Reef Water, at the Volume Ratio Indicated to Provide a Polyacrylamide Concentration of about 1,000 mg/l in the mixture.

| Brine 8,000 mg/l NaCl (Parts/100) | Hendrick Reef Water[2] 1,115 mg/l Divalent Ions 8,730 mg/l TDS (Parts/100) | Screen Factor | Viscosity (centipoise) |
|---|---|---|---|
| 100 | 0 | 20.2 | 4.4 |
| 60 | 40 | 6.6 | 3.1 |
| 40 | 60 | 12.3 | 3.2 |
| 20 | 80 | 14.1 | 3.2 |

[1]Polyacrylamide marketed by the Betz Chemical Company under the tradename "Uniperm".
[2]Hendrick reef water having 1,000 mg/l of this polyacrylamide hydrated therein has a screen factor of about 10.6 and a viscosity of about 2.2 centipoise (cps).

The resistance to movement and the viscosity of polyacrylamide hydrated in brine having no hardness and about 8,000 mg/l of total dissolved solids is illustrated in Table 2. It is shown that mixtures of greater than about 60 parts by volume hard brine with less than about 40 parts by volume prehydrated polyacrylamide solution have screen factors which are lower than the screen factor of polyacrylamide hydrated in the hard brine. At higher ratios of hard brine to prehydrated polyacrylamide, the screen factor tends to increase.

TABLE III

Polyacrylamide[1] Hydrated in Brine and Mixed with South Station Water, at the Volume Ratio Indicated to Provide a Polyacrylamide Concentration of about 1,000 mg/l in the Mixture.

| Brine 8,000 mg/l NaCl (Parts/100) | South Station Water[2] 1,730 mg/l Divalent Ions 24,400 mg/l TDS (Parts/100) | Screen Factor | Viscosity (centipoise) |
|---|---|---|---|
| 100 | 0 | 11.2 | 2.6 |
| 60 | 40 | 4.8 | 2.2 |
| 40 | 60 | 12.1 | 2.5 |
| 20 | 80 | 16.4 | 3.4 |

[1]Polyacrylamide supplied by the Dow Chemical Company under the tradename "Pusher XP4146.01L."
[2]South Station water having 1,000 mg/l of this polyacrylamide hydrated therein has a screen factor of about 13.2 and a viscosity of about 1.9 cps.

The resistance to movement and viscosity of a polymer bank formulated with an aqueous fluid having high hardness and salinity is also illustrated in Table III. The polyacrylamide was hydrated in brine having no hardness and about 8,000 mg/l of total dissolved solids and was mixed with various volume ratios of hard brine. It is shown in Tables II and III that mixtures of greater than about 60 parts by volume hard brine with less than about 40 parts by volume prehydrated polyacrylamide solution exhibit improved resistance to flow through a subterranean reservoir, as indicated by screen factor measurements, when compared to polyacrylamide hydrated directly in the hard brine. Mixtures of about 80 parts by volume hard brine with about 20 parts by volume prehydrated polyacrylamide are shown in Tables II and III to have screen factors which are at least about 25% higher than the screen factor of polyacrylamide hydrated directly in the hard brine. The polyacrylamide used for formulating fluids shown in Table III had a greater tolerance of divalent ions than the polyacrylamide used in formulating the fluid shown in Table II. It is also shown in Tables II and III that the detrimental effect of salinity and hardness on viscosity is not reduced by prehydrating the polyacrylamide in brine with no hardness and mixing the prehydrated polyacrylamide with brine having high salinity and hardness.

TABLE IV

Polyacrylamide[1] Hydrated in the Aqueous Fluid Indicated and Mixed at the Ratio of about 40 Parts by Volume Aqueous Fluid to about 60 Parts by Volume of South Station Water[2] (1730 mg/l Divalent ions and 24,400 mg/l TDS) to Provide a Polyacrylamide Concentration of about 1,000 mg/l in the Mixture.

| Aqueous Fluid | Screen Factor |
|---|---|
| Distilled water | 20.1 |
| Distilled water 8,000 mg/l NaCl | 20.2 |
| Clean Hendrick Reef Water | 14.6 |

[1]Polyacrylamide marketed by the Betz Chemical Company under the tradename "Uniperm".
[2]South Station water having 1000 mg/l of this polyacrylamide hydrated therein has a screen factor of about 11.7.

It is shown in Table IV that mixtures of 40 parts by volume of prehydrated polyacrylamide solution with about 60 parts by volume hard brine have improved resistance to movement through a reservoir, as indicated by screen factor measurements, when compared to the hard brine having the polyacrylamide hydrated directly therein. It is also shown that mixtures of hard brine with polyacrylamide hydrated in clean Hendrick Reef water have a lower screen factor than mixtures of the hard brine with polyacrylamide hydrated in aqueous fluids having no hardness. The Hendrick Reef water was aerated until the evolution of hydrogen sulfide and precipitation of colloidal sulfur and excess hardness had terminated, then it was filtered and the supernatant liquid was used as the clean Hendrick Reef water. The clean Hendrick Reef water contains divalent cations.

TABLE V

Polyacrylamide[1] Hydrated in the Aqueous Fluid Indicated and Mixed at the Ratio of about 20 Parts by Volume Aqueous Fluid to about 80 Parts by Volume of South Station Water[2] (1730 mg/l Divalent ions and 24,400 mg/l TDS) to Provide a Polyacrylamide Concentration of about 1,000 mg/l in the Mixture.

| Aqueous Fluid | Screen Factor |
|---|---|
| Distilled water | 22.5 |
| 8000 mg/l NaCl | |
| Clean Hendrick Reef water | 14.8 |

[1] Polyacrylamide marketed by the Betz Chemical Company under the tradename "Uniperm".
[2] South Station water having 1000 mg/l of this polyacrylamide hydrated therein has a screen factor of about 11.7.

Resistance to movement of mixtures of 20 parts by volume prehydrated polyacrylamide solution and 80 parts by volume of hard brine, as shown by screen factor measurements in Table V, is about the same as the resistance to movement of mixtures of 40 parts by volume prehydrated polyacrylamide solution and 60 parts by volume hard brine as shown in Table IV. The effect of differences in hardness and salinity between the aqueous fluids in which the polyacrylamide is hydrated and the hard brine with which the polymer bank is formulated on the resistance of these mixtures to movement through reservoirs is shown in Tables IV and V.

TABLE VI

Polyacrylamide[1] Hydrated in the Aqueous Fluid Indicated and Mixed at the Ratio of about 40 Parts by Volume Aqueous Fluid to about 60 Parts by Volume of Hendrick Reef Water[2] (1115 mg/l Divalent Ions and 8730 mg/l TDS) to Provide a Polyacrylamide Concentration of about 1,000 mg/l in the Mixture.

| Aqueous Fluid | Screen Factor |
|---|---|
| Distilled water | 11.4 |
| Distilled water 8,000 mg/l NaCl | 12.3 |
| Clean Hendrick Reef water | 10.0 |

[1] Polyacrylamide marketed by the Betz Chemical Company under the tradename "Uniperm".
[2] Hendrick Reef water having 1,000 mg/l of this polyacrylamide hydrated therein has a screen factor of about 10.6.

It is shown in Table VI that resistance to movement, as indicated by screen factor measurements, of mixtures of 40 parts by volume prehydrated polyacrylamide solution with about 60 parts by volume hard brine is greater than the resistance exhibited by the hard brine having the polyacrylamide hydrated therein, except for polyacrylamide prehydrated in hard brine.

TABLE VII

Polyacrylamide[1] Hydrated in the Aqeuous Fluid Indicated and Mixed at the Ratio of about 40 Parts by Volume Aqeuous Fluid to about 60 Parts by Volume of Hendrick Reef Water[2] (1115 mg/l Divalent Ions and 8730 mg/l TDS) to Provide a Polyacrylamide Concentration of about 1,000 mg/l in the Mixture.

| Aqeuous Fluid | Screen Factor |
|---|---|
| Distilled water 8000 mg/l NaCl | 14.1 |
| Clean Hendrick Reef water | 10.9 |

[1] Polyacrylamide marketed by the Betz Chemical Company under the tradename "Uniperm".
[2] Hendrick Reef water having 1,000 mg/l of this polyacrylamide hydrated therein has a screen factor of about 10.6.

It is shown in Table VII that resistance to movement of mixtures of 20 parts by volume polyacrylamide prehydrated in brine having no hardness with about 80 parts by volume in hard brine is greater than the resistance exhibited by the hard brine having the polyacrylamide hydrated therein, except for polyacrylamide prehydrated in hard brine.

As can be seen from the tables, resistance to movement of a hard, saline polymer bank through a reservoir, as indicated by screen factor measurements, can be improved by prehydrating a viscoelastic polymer such as polyacrylamide in an aqueous fluid which has less hardness than the polymer bank. Aqueous fluid with reduced hardness can be obtained by removing divalent ions from a portion of the hard brine from which the polymer bank is to be formulated and using the treated water for prehydrating the polymer. Commercially available ion exchange processes would be suitable for performing this water treatment. These processes can reduce the divalent cation concentrations to less than about 100 mg/l.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed:

1. In a method of displacing oil through at least a portion of a crude oil containing subterranean reservoir having an injection means and fluid communication through the reservoir with a production means, wherein a hard saline aqueous viscoelastic polymer solution having a divalent cation concentration of at least about 500 mg/l and total dissolved solids of at least about 5000 mg/l is injected into the reservoir at the injection means and is displaced through at least a portion of the reservoir for displacing crude oil towards the production means, wherein the improvement comprises:

increasing the resistance of said viscoelastic polymer solution to movement through the subterranean reservoir by prehydrating a viscoelastic polyacrylamide in an aqueous fluid having a divalent cation concentration of not greater than about 100 mg/l and mixing the resulting prehydrated viscoelastic polymer with a hard brine having a sufficient divalent cation concentration and a total dissolved solids concentration to provide said hard, saline aqueous viscoelastic polymer solution having a divalent cation concentration of at least 500 mg/l and total dissolved solids of at least about 5000 mg/l.

2. In a method of increasing the resistance of a hard saline viscoelastic polymer solution to movement through a crude oil containing subterranean reservoir having an injection means in fluid communication through the reservoir with a production means, wherein crude oil is displaced through at least a portion of the reservoir by injecting into the reservoir at said injection means a crude oil displacing fluid followed by the injection of said polymer solution for mobility control and by the injection of a displacement fluid for displacing fluid and said polymer solution towards said production means wherein the improvement comprises:

increasing the resistance of said viscoelastic solution to movement through the subterranean reservoir by prehydrating a viscoelastic polyacrylamide in an aqueous fluid having a divalent cation concentration of not greater than about 100 mg/l and mixing the resulting prehydrated viscoelastic polymer with a hard brine having a sufficient divalent cation concentration and a total dissolved solids concentration to provide a hard saline aqueous viscoelastic polymer solution having a divalent cation concentration of at least 500 mg/l and a total dissolved solids concentration of at least about 5000 mg/l.

3. The method of claims 1 or 2 wherein at least about 60 parts by volume of said hard brine is mixed with less than about 40 parts by volume of said prehydrated viscoelastic polymer.

4. The method of claim 3 wherein at least about 80 parts by volume of said hard brine is mixed with less than about 20 parts by volume of said prehydrated viscoelastic polymer.

* * * * *

UNITED STATES PATENT OFFICE
CERTIFICATE OF CORRECTION

PATENT NO. : 4,262,746

DATED : April 21, 1981

INVENTOR(S) : Robert E. Hammett

It is certified that error appears in the above-identified patent and that said Letters Patent are hereby corrected as shown below:

Column 5, 62, "40" should read ---20---.

Column 5, line 63, "60" should read ---80---.

Column 5, line 69 below "clean Hendrick" and above "polyacrylamide" insert ---Reef water---.

Column 6, line 1-8, delete "entire table" (double printing).

Signed and Sealed this

Fourteenth Day of July 1981

[SEAL]

Attest:

GERALD J. MOSSINGHOFF

Attesting Officer

Commissioner of Patents and Trademarks